United States Patent
Kazienko et al.

[15] 3,684,317
[45] Aug. 15, 1972

[54] PIPE JOINT

[72] Inventors: Henry Joseph Kazienko, Somerville; Walter Madison Palmer, Lawrenceville, both of N.J.

[73] Assignee: Johns-Manville Corporation, New York, N.Y.

[22] Filed: April 20, 1970

[21] Appl. No.: 29,943

[52] U.S. Cl. ................285/110, 285/230, 285/345, 277/205
[51] Int. Cl. ............................................F16l 17/02
[58] Field of Search......285/110, 111, 230, 231, 345; 277/DIG. 2, 205, 211

[56] References Cited

UNITED STATES PATENTS

| | | | |
|---|---|---|---|
| 1,945,293 | 1/1934 | Pierce | 277/205 X |
| 3,020,054 | 2/1962 | Draincourt | 277/207 A |
| 3,064,983 | 11/1962 | Halterman | 285/110 X |
| 3,315,971 | 4/1967 | Sakurada | 285/110 X |
| 3,368,830 | 2/1968 | French | 285/345 X |

FOREIGN PATENTS OR APPLICATIONS

| | | | |
|---|---|---|---|
| 884,260 | 7/1953 | Germany | 277/205 |
| 406,120 | 1934 | Great Britain | 277/205 |
| 1,435,463 | 3/1966 | France | 285/110 |
| 6,713,595 | 4/1969 | Netherlands | 285/111 |

*Primary Examiner*—Andrew V. Kundrat
*Attorney*—John A. McKinney and Robert M. Krone

[57] ABSTRACT

A pipe joint having an annular resilient gasket having a plurality of distinct portions separated by a plurality of recesses which cooperate with a pipe end and coupling member to provide good sealing characteristics with a minimum of assembly effort.

6 Claims, 5 Drawing Figures

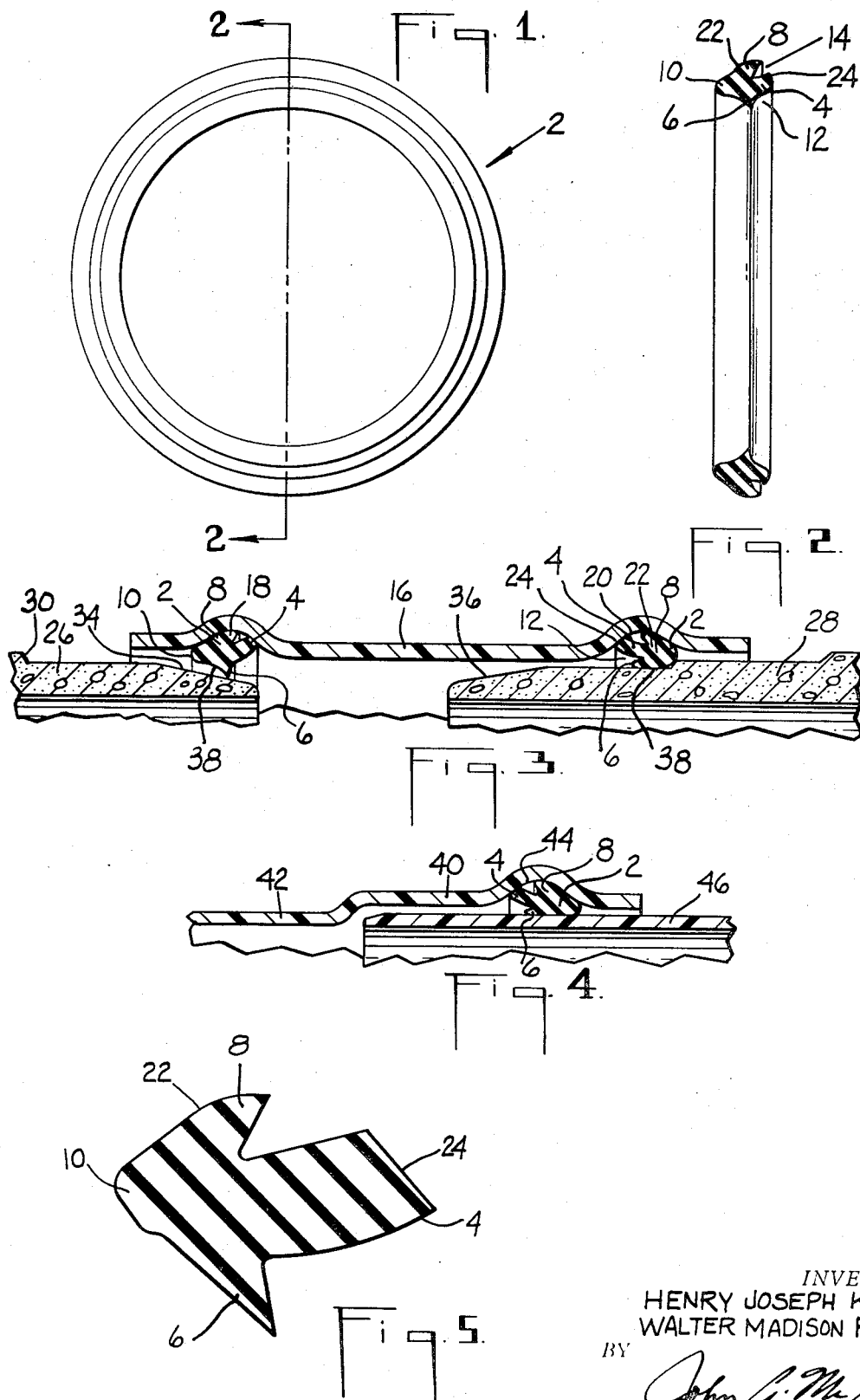

PIPE JOINT

BACKGROUND OF THE INVENTION

This invention relates to pipe joints and their assembly. While the invention has utility in many types of pipe, for example, asbestos-cement, clay or cast iron, it is particularly adapted for use in connecting sections by a coupling member wherein a resilient gasket is seated in a groove in the coupling member. In particular, the invention is advantageously employed with coupling members wherein the groove profile tends to be generally rounded. The coupling member may comprise a separate unit or a bell end on the pipe.

In coupling members formed of a plastic material such as polyvinyl chloride (PVC), it is customary to form the grooves therein by a molding or heat forming operation. In most commercial operations, the PVC coupling member has a thickness that makes it extremely difficult, if not impossible, to form the grooves in such coupling members in any shape other than generally rounded at least at the corners. This design configuration encourages the possibility that a portion of the resilient gasket will be urged out of the groove by the leading edge of the pipe during the formation of the joint. While this may not happen in all instances, it is of such a nature that any failure from this occurrence is not discovered until after the completed pipe line has been installed. Therefore, any failure is more than just a nuisance.

BRIEF SUMMARY OF THE INVENTION

It is an object of this invention to provide a resilient gasket for cooperation with the components of a pipe joint which will not be readily displaced or distorted from its proper position or orientation during the assembly.

It is a further object of this invention to provide a pipe joint comprising a pipe end, a resilient gasket, and a coupling member so as to insure proper seating of the resilient gasket and to minimize the required assembly forces.

The foregoing objects are accomplished in accordance with this invention by a resilient gasket having a configuration designed to preclude the possibility of its being displaced from the groove during the insertion of the pipe end into the coupling member in the formation of the joint. The surface of the resilient gasket in contact with the surface defining the groove comprises two distinct elements each of which has contact with the groove surface over a substantial area. The resilient gasket is further provided with a protruding fin on its inner surface which fin is adapted to be contacted by pipe end and deflected. The radial thickness of the resilient gasket, particularly at the fin area, in its relaxed state is greater than the radial distance between the pipe and the wall of the groove so as to provide a positive seal. The deflected portion of the fin cooperates with each of the two elements in contact with the surface of the groove wall to provide a seal.

BRIEF DESCRIPTION OF THE DRAWINGS

The invention will be more fully understood and futher objects and advantages thereof will become apparent when reference is made to the following detailed description of the preferred embodiment of the invention and the accompanying drawings in which:

FIG. 1 is a view in end elevation of a resilient gasket made in accordance with the instant invention;

FIG. 2 is a view in cross-section taken along the plane passing through the line 2—2 of FIG. 1;

FIG. 3 is a view in cross-section of a portion of a joint of this invention utilizing a sleeve type coupling;

FIG. 4 is a view in cross-section of a portion of a joint utilizing a bell end on the pipe, and FIG. 5 is a view of the cross sectional shape of the gasket.

DESCRIPTION OF THE PREFERRED EMBODIMENT

Referring to the drawing and, in particular, to FIGS. 1 and 2, there is illustrated an annular resilient gasket 2 having a nose portion 4, an inside fin 6 and an outside fin 8, and a butt portion 10. Between the nose portion 4 and the inside fin 6 there is a V-shaped recess 12 which extends circumferentially around the resilient gasket 2. Between the nose portion 4 and the outside fin 8 there is a V-shaped recess 14 which extends circumferentially around the resilient gasket 2. The annular resilient gasket 2 preferably comprises a rubber, natural or synthetic, having a durometer of about 50 to 70.

In FIG. 3, there is illustrated a joint of this invention wherein the coupling member comprises a sleeve type coupling 16 having a pair of spaced annular grooves 18 and 20 in the inner surface thereof. The sleeve type coupling 16 has a generally cylindrical inner surface with the portion between the grooves having an inside diameter smaller than the inside diameter of the portion between each groove and its associated axial extremity. In the embodiment illustrated in FIG. 3, the sleeve type coupling 16 comprises a polyvinyl chloride material (PVC) which has been formed into the illustrated shape by a conventional heat forming operation. As described above, the grooves 18 and 20 have a surface which in its axial direction is generally rounded.

A resilient gasket 2 is seated in each of the grooves 18 and 20. It is noted that the outer surface 22 of the outside fin 8 has a configuration that is generally similar to the surface configuration of the groove with which it is in contact when properly seated therein. Also, the surface 24 of the nose section 4 corresponds generally to the surface of the groove adjacent thereto and with which surface it is adapted to contact. As illustrated in FIG. 3 when the resilient gasket 2 is seated in the groove 18 or 20, the surfaces 22 and 24 are in contact with the adjacent surfaces of the groove to form substantial areas of contact.

The butt portion 10 of the resilient gasket 2 protrudes generally radially inwardly from the end of each groove 18 or 20 closer to the associated axial extremity of the sleeve type coupling 16. In the relaxed condition of the resilient gasket 2 as illustrated in FIG. 3, the inside fin 6 protrudes inwardly so as to provide a substantial quantity of rubber to be contacted by the pipe end as it is inserted into the sleeve type coupling 16. It is further noted that the inside fin 6 lies substantially opposite the outside fin 8 in a generally radial direction so as to cooperate therewith in providing a positive seal for the joint. The thickness of the resilient gasket 2 in a radial direction between the surface of the inside fin 6 and the outside fin 8 has, for a substantial portion thereof in an axial direction, a thickness greater than the distance in a radial direction between the associated sealing surfaces of the pipe and the coupling groove.

A pipe joint utilizing the resilient gasket 2 and the sleeve type coupling 16 of this invention is assembled as illustrated in the left and right side of FIG. 3. The illustrated joint comprises a pair of adjacent pipes 26 and 28 which are to be sealed with a fluid-tight joint. In the illustrated embodiment, each of the pipes 26 and 28 comprises an asbestos-cement pipe having cylindrical surfaces of different diameters machined on the outside surfaces thereof so as to provide shoulders 30 and 32 which are adapted to be contacted by the resilient gasket 2 to provide automatic end separation, sleeve centering, and increased resistance to blow-out in the joint. The portions 34 and 36 of the pipes 26 and 28 are inclined so as to provide easier and more foolproof assembly. In the left side of FIG. 3, a resilient gasket 2 has been seated in the groove 18 and the pipe 26 has been inserted into the sleeve type coupling 16 so that its inclined portion 34 is about to contact the inside fin 6. As the pipe continues its movement into the sleeve type coupling 16, the inside fin 6 is gradually deformed as a result of the assembly forces being applied by the pipe 26 on the surface 38 of the inside fin 6. The movement of the pipe continues until the shoulder 30 contacts the butt section 10. At this time, the solid section of the resilient gasket, extending from the edge of the butt portion 10 to the surface 24 of the nose portion 4 which is in contact with the surface of the groove 18, stops the movement of the pipe.

The fully assembled relationship of the components of the joint is illustrated in the right side of FIG. 3. The resilient gasket 2 has been deformed by the assembly forces so that the surfaces 38, 24, and 22 are being urged into close sealing relationship with the adjacent surfaces of the pipe 28 and the groove 20. The deformation of the inside fin 6 functions to decrease the angle of the V-shaped recess 12. The initial seal of the gasket is obtained by the contact of the surface 38 with the adjacent surface of the pipe and the contact of the surface 24 with the adjacent surface of the groove 20. As the internal fluid pressure is increased, these surfaces are urged into greater sealing relationship since movement of the resilient gasket 2 is prevented by the cooperation between the shoulder 32 with the radially adjacent surfaces of the sleeve type coupling 16. If for some reason, the surface 24 of the nose section 4 is not in initial sealing relationship, a positive seal is obtained by the contact of the surface 38 with the adjacent surface of the pipe and the contact of the surface 22 with the adjacent surface of the groove. As explained above, this seal is obtained since the thickness of the gasket 2 in a radial direction between the surfaces of the inside fin 6 and the outside fin 8 is greater than the distance in a radial direction between the associated sealing surfaces of the pipe 28 and the groove 20.

The resilient gasket 2 of this invention cooperates with the coupling member and the pipe to provide many advantageous results. The nose portion 4 is of substantial thickness so that it may cooperate with the butt section 10 in providing a solid piece of rubber for cooperating with the shoulder on the pipe and the axial opposite wall of the groove to provide automatic end separation and sleeve centering. The V-shaped recess 12 provides cooperation between the nose portion 4 and the deformed inside fin 6 to provide the initial seal from which the primary seal for the joint is obtained. This cooperation allows for easy assembly effort while still insuring a fluid tight seal. The V-shaped recess 14 cooperates with the nose portion 4 and the V-shaped recess 12 to allow sufficient flexibility of the nose portion 4 to absorb or give slightly with any undue force tending to twist the gasket in the groove or to expel the gasket from the groove. This V-shaped recess 14 further cooperates with the outside fin 8 to provide space for deformation thereof during assembly and thereby allowing for easier assembly effort. This cooperation also functions to insure the positive seal referred to above in cooperation with the inside fin 6. In the joint illustrated in FIG. 3, the different sizes of inside diameter of the sleeve type coupling 16 cooperates with the different sizes in the outside diameter of the pipe which form the shoulder to minimize in all locations the radial distance between the sleeve type coupling 16 and each pipe 26 or 28.

In FIG. 4, there is illustrated a joint of this invention wherein the coupling member is a bell end 40 on the pipe 42 with an annular groove 44 in the inner surface of the bell end. In this embodiment, the pipe 42 comprises a polyvinyl chloride (PVC) material and the bell end 40 and the annular groove 44 are formed therein by a conventional heat forming process such as illustrated in U.S. Pat. No. 3,205,535. As described in relation to FIG. 3, the groove 44 has a surface configuration in an axial direction that is generally rounded. The gasket 2 seated in the groove 44 is similar to that described above and has been provided with the corresponding reference numbers.

The pipe 46 which is shown in its assembled position within the bell end 40 comprises a polyvinyl chloride (PVC) material. This pipe differs from that illustrated in FIG. 3 in that there is no shoulder on the pipe. However, all of the other advantages, such as easy assembly effort while providing an initial seal and a positive seal and the added resistance to gasket twisting in or dislodging of all or part from the groove obtained as described in relation to FIG. 3, and also obtained by the cooperation of the elements in the joint illustrated in FIG. 4.

In the embodiments of the invention illustrated in FIGS. 3 and 4, the groove in the coupling member is shown as generally rounded in the axial direction. While the invention is particularly directed for use with such shaped grooves, other shaped grooves such as triangular or rectangular may be utilized. The invention is particularly concerned with establishing the relationship wherein the resilient gasket is formed with distinct portions such as the outside fin, the nose section, and the inside fin, which are shaped by recesses but which have substantial surface areas in contact with the adjacent surfaces of the coupling element and the pipe. Furthermore, in those instances where required, the gasket is provided with a solid rubber section that can cooperate with a shoulder on the pipe and the wall of the groove in providing automatic end separation, sleeve centering, and increased resistance to blow-out.

The gasket illustrated in FIG. 5 represents the preferred cross-sectional configuration for a gasket of this invention. In this illustration, it is noted that the nose section from the vertex of the V-shaped recess 12 and the vertex of the V-shaped recess 14 extends in an axial direction an amount approximately equal to the axial extent from the axial extremity of the butt section 10 to these vertexes. This particular gasket geometry is particularly suited for cooperation with coupling members having grooves having a generally rounded configuration in an axial direction. However, it is noted that variations from this particular configuration may be made provided the basic concept of a plurality of distinct portions separated by a plurality of recesses is maintained in the gasket.

What we claim is:

1. A pipe joint comprising:
   a. a coupling member having an annular groove of arcuate cross-sectional configuration in its inner peripheral surface,
   b. a pipe end within said coupling member,
   c. an annular resilient gasket seated in said groove, said gasket having an outside fin, a nose portion, an inside fin and a butt portion; said outside fin and said nose portion being separated from each other by an annular recess, and said inside fin and said nose portion being separated from each other by a second annular recess, said outside fin and said nose portion being deformed into sealing contact with said groove with said nose portion bearing against the groove while remaining separated from said outside fin to brace the gasket against displacement, and said inside fin being deformed into sealing contact with an outer surface of said pipe end.

2. A pipe joint as defined in claim 1 and further comprising:
   a. a shoulder on said pipe end, and
   b. said butt portion of said gasket being solid rubber and in contact with said shoulder to position said pipe end relative to said coupling member.

3. A pipe joint as defined in claim 2 wherein:
   a. said coupling member comprises a sleeve type coupling having a pair of spaced annular grooves in the inner surface thereof,
   b. one of said annular resilient gaskets in each of said groves,
   c. a pair of pipe ends positioned in said coupling member and cooperating with said resilient gaskets and the surfaces defining said grooves in forming a fluid tight seal.

4. A pipe joint as defined in claim 3 wherein:
   a. said coupling comprises a polyvinyl chloride material, and
   b. said pipe ends comprise an asbestos-cement material with a shoulder on each of said pipe ends.

5. A pipe joint as defined in claim 4 wherein:
   a. the inside diameter of said coupling member between said annular grooves is smaller than the inside diameters of portions of said coupling member between said annular grooves and axial extremities of said coupling member.

6. A pipe joint as defined in claim 1 wherein:
   a. said coupling member comprises a bell end on a pipe.

* * * * *